United States Patent
Huang et al.

(10) Patent No.: US 7,037,983 B2
(45) Date of Patent: May 2, 2006

(54) METHODS OF MAKING FUNCTIONAL BIODEGRADABLE POLYMERS

(75) Inventors: Yanbin Huang, Roswell, GA (US); Jaeho Kim, Roswell, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 127 days.

(21) Appl. No.: 10/302,483

(22) Filed: Nov. 22, 2002

(65) Prior Publication Data

US 2003/0232929 A1    Dec. 18, 2003

Related U.S. Application Data

(60) Provisional application No. 60/389,026, filed on Jun. 14, 2002.

(51) Int. Cl.
   C08G 63/47    (2006.01)
   C08G 63/78    (2006.01)
   C08G 63/91    (2006.01)
   C08F 283/01   (2006.01)

(52) U.S. Cl. .................................................. 525/412
(58) Field of Classification Search ................. 525/412
See application file for complete search history.

(56) References Cited

U.S. PATENT DOCUMENTS

| | | | |
|---|---|---|---|
| 3,760,034 A | 9/1973 | Critchfield et al. | |
| 4,615,697 A | 10/1986 | Robinson | |
| 4,795,436 A | 1/1989 | Robinson | |
| 5,225,196 A | 7/1993 | Robinson | |
| 5,318,719 A * | 6/1994 | Hughes et al. | 8/137 |
| 5,350,371 A | 9/1994 | Van Iten | |
| 5,399,665 A | 3/1995 | Barrera et al. | |
| 5,474,768 A | 12/1995 | Robinson | |
| 5,610,241 A | 3/1997 | Lee et al. | |
| 5,654,381 A | 8/1997 | Hrkach et al. | |
| 5,739,176 A * | 4/1998 | Dunn et al. | 523/113 |
| 5,795,346 A | 8/1998 | Achter et al. | |
| 5,837,274 A | 11/1998 | Shick et al. | |
| 5,929,196 A | 7/1999 | Kissel et al. | |
| 5,952,433 A * | 9/1999 | Wang et al. | 525/415 |
| 6,017,521 A | 1/2000 | Robinson et al. | |
| 6,039,716 A | 3/2000 | Jessup et al. | |
| 6,051,248 A | 4/2000 | Sawhney et al. | |
| 6,117,949 A | 9/2000 | Rathi et al. | |
| 6,166,130 A | 12/2000 | Rhee et al. | |
| 6,201,072 B1 | 3/2001 | Rathi et al. | |
| 6,579,934 B1 * | 6/2003 | Wang et al. | 525/63 |
| 2002/0193517 A1 * | 12/2002 | Wang et al. | 525/63 |

FOREIGN PATENT DOCUMENTS

| | | |
|---|---|---|
| EP | 0429307 A2 | 5/1991 |
| EP | 0797457 B1 | 7/2001 |
| WO | 97/13502 | 4/1997 |
| WO | 97/47670 | 12/1997 |
| WO | 98/55147 | 12/1998 |
| WO | 99/06456 | 2/1999 |
| WO | 00/15192 | 3/2000 |
| WO | 00/60956 | 10/2000 |

OTHER PUBLICATIONS

Peppas, N.A. et al., "Surface, Interfacial and Molecular Aspects of Polymer Bioadhesion on Soft Tissues", *Journal of Controlled Release*, vol. 2, 1985, pp. 257-275.

Gu, J.M. et al., "Binding of Acrylic Polymers to Mucin/Epithelial Surfaces: Structure-Property Relationships", *CRC Critical Reviews of Therapeutic Drug Carrier Systems*, 1988, vol. 5, Issue 1, pp. 21-67.

Peppas, N.A. and Buri, P.A., "Bioadhesives for Optimization of Drug Delivery", *Journal of Drug Targeting*, 1995, vol. 3, pp. 183-184.

Chu, Chih-Chang, "Biodegradable Polymeric Biomaterials: An Overview", *The Biomedical Engineering Handbook*, edited by J.D. Bronzino, CRC Press, 1995, pp. 611-626.

Y. Sun et al., "Biodegradable Polymers and Their Degradation Mechanisms", *American Pharmaceutical Review*, 4(3), 2001, pp. 8-18.

Okada, Masahiko, "Chemical Syntheses of Biodegradable Polymers", *Progress in Polymer Science*, 27, 2002, pp. 87-133.

Schlievert, P.M. and Blomster, D.A., Production of Staphylococcal Pyrogenic Exotoxin Type C: Influence of Physical and Chemical Factors, *The Journal of Infectious Diseases*, vol. 147, No. 2, Feb. 1983, pp. 236-242.

(Continued)

Primary Examiner—Jeffrey B. Robertson
(74) Attorney, Agent, or Firm—Dority & Manning, P.A.

(57) ABSTRACT

There is provided a method to modify biodegradable polymers using the direct reaction of a biodegradable polymer in a vinyl monomer and may take place in the presence of initiators. The initiator may be free radical initiators, heat, ionic initiators, UV irradiation, ionizing irradiation and other high energy irradiation. Suitable biodegradable polymer include polycaprolactone, poly(lactic acid), poly(glycolic acid) and poly(lactic-co-glycolic acid). Suitable vinyl monomers include acrylates, methacrylates and the like.

31 Claims, 4 Drawing Sheets

OTHER PUBLICATIONS

Holst, E. et al., "Treatment of Bacterial Vaginosis in Pregnancy with a Lactate Gel", *Scandinavian Journal of Infectious Diseases*, vol. 22, No. 5, 1990.

Hill-West, J.L. et al., "Inhibition of Thrombosis and Intimal Thickening by in situ Photopolymerization of Thin Hydrogel Barriers", *Proceedings of National Academy of Science USA*, Medical Sciences, vol. 91, Jun. 1994, pp. 5967-5971.

Göpferich, A., "Mechanisms of Polymer Degradation and Erosion", Biomaterials, vol. 17, No. 2, 1996, pp. 103-114.

Odian, G., "Radical Chain Polymerization", *Principles of Polymerization*, McGraw-Hill Book Company, 1970, pp. 174-185; 194-201.

Yamaoka, T. and Kimura, Y., " Biodegradable Copolymers", Concise Polymeric Materials Encyclopedia, CRC Press, 1998, pp. 109-111.

Barrera, D.A. et al., "Copolymerization and Degradation of Poly(lactic acid-co-lysine)", *Macromolecules*, vol. 28, No. 2, 1995, pp. 425-432.

Hrkach, J.S. et al., "Synthesis of Poly(L-lactic acid-co-L-lysine) Graft Copolymers", *Macromolecules*, vol. 28, No. 13, 1995, pp. 4736-4739.

Lavik, E.B. et al., "A Simple Synthetic Route to the Formation of a Block Copolymer of Poly(lactic-co-glycolic acid) and Polylysine for the Fabrication of Functionalized, Degradable Structures for Biomedical Applications", *Journal of Biomedical Materials Research Applied Biomaterials*, Jan. 2001, 58, pp. 291-294.

Zhang, Y. et al., "Synthesis and Characterization of Biodegradable Network Hydrogels Having Both Hydrophobic and Hydrophilic Components with Controlled Swelling Behavior", Journal of Polymer Science A: Polymer Chemistry, Aug. 1999, 37, pp. 4554-4569.

Furch, M. et al., "Synthesis and Characterisation of Copolymers of Methyl Acrylate and Poly(glycolide) Macromonomers", *Polymer*, vol. 39, No. 10, 1998, pp. 1977-1982.

Shinoda, H. et al., "Structural Control of Poly(Methyl Methacrylate)-g-poly(Lactic Acid) Graft Copolymers by Atom Transfer Radical Polymerization (ATRP)", *Macromolecules*, vol. 34, No. 18, 2001, pp. 6243-6248.

West, J.L. et al., "Separation of the Arterial Wall from Blood Contact Using Hydrogel Barriers reduces Intimal Thickening After Balloon Injury in the Rat: The Roles of Medial and Luminal Factors in Arterial Healing", *Proceeding of National Academy of Science USA*, vol. 93, Nov. 1996, pp. 13188-13193.

Jeong, B. et al., "Biodegradable Block Copolymers as Injectable Drug-Delivery Systems", *Nature*, vol. 388, Aug. 1997, pp. 860-862.

Jeong, B. et al., "Thermoreversible Gelation of PEG-PLGA-PEG Triblock Copolymer Aqueous Solutions", *Macromolecules*, vol. 32, No. 21, 1999, pp. 7064-7069.

Riley, T. et al., "Physicochemical Evaluation of Nanoparticles Assembled from Poly(lactic acid)-Poly (ethylene glycol) (PLA-PEG) Block Copolymers as Drug Delivery Vehicles", *Langmuir*, vol. 17, No. 11, Feb. 2001, pp. 3168-3174.

Kissel, T. et al., "ABA-triblock Copolymers from Biodegradable Polyester A-blocks and Hydrophilic Poly (ethylene oxide) B-blocks as a Candidate for in situ Forming Hydrogel Delivery Systems for Proteins", *Advanced Drug Delivery Reviews*, 54, 2002, pp. 99-134.

Jeong, B. et al., "Thermogelling Biodegradable Polymers with Hydrophilic Backbones: PEG-g-PLGA", *Macromolecules*, vol. 33, No. 22, 2000, pp. 8317-8322.

Li, Y. et al., "Biodegradable Brush-Like Graft Polymers from Poly(D,L-lactide) or Poly(D,L-lactide-co-glycolide) and Charge-Modified, Hydrophilic Dextrans as Backbone—In-Vitro degradation and Controlled Releases of Hydrophilic Macromolecules", *Polymer*, vol. 39, No. 14., 1998, pp. 3087-3097.

Li, Y., et al., "Biodegradable Brush-Like Graft Polymers from Poly(D,L-lactide) or Poly(D,L-lactide-co-glycolide) and Charge-Modified, Hydrophilic Dextrans as Backbone—Synthesis, Characterization and in vitro Degradation Properties", *Polymer*, vol. 38, No. 25, 1997, pp. 6197-6206.

Breitenbach, A. et al., "Biodegradable Comb Polyesters. Part II. Erosion and Release Properties of Poly(vinyl alcohol)-g-poly(lactic-co-glycolic acid)", *Polymer*, 41, 2000, pp. 4781-4792.

Mark, J.E., *Polymer Data Handbook*, Oxford University Press, New York, 1999, pp. 252-253; 361-362; 566-569; 627-633; 638-640.

Mitomo, H. et al., "Radiation-Induced Graft Polymerization of Poly(3-Hydroxybutyrate) and Its Copolymer", *Journal of Macromolecular Science*, vol. 32, Nos. 1-4, 1995, pp. 429-442.

Södergård, A. et al., "Properties of Lactic Acid Based Polymers and Their Correlation with Composition", *Progress in Polymer Science*, 27, 2002, pp. 1123; 1132-1134.

Södergård, A., "Preparation of Poly(L-Lactide-Graft-Acrylic Acid) By Pre-Irradiation Grafting", *Polymer Preprints*, vol. 39, No. 2, Aug. 1998, pp. 214-215.

Södergård, A., "Preparation of Poly (e-caprolactone)—co-Poly(acrylic acid) by Radiation-Induced Grafting", *Journal of Polymer Science*, vol. 36, No. 11, Jun. 1998, pp. 1805-1812.

Såilynoja, E.,et al., "Immobilization of a Biologically Active Coating on a Hydrophobic L-lactide-ε-caprolactone Copolymer", *Journal of Materials Science Materials in Medicine*, vol. 10, No. 12, Dec. 1999, pp. 703-705.

Ohrlander, M. et al., "The Grafting of Acrylamide onto Poly(ε-caprolactone) and Poly(1,5-dioxepan-2 one) Using Electron Beam Preirradiation. II. An in Vitro Degradation Study on Grafted Poly(ε-caprolactone)", *Journal of Polymer Science*, vol. 37, No. 11, Apr. 1999, pp. 1651-1657.

Ohrlander, M. et al., "The Grafting of Acrylamide onto Poly(ε-caprolactone) and Poly(1,5-dioxepan-2-one) Using Electron Beam Preirradiation. III. The Grafting and in Vitro Degradation of Chemically Crosslinked Poly(1,5-dioxepan-2-one)", *Journal of Polymer Science*, vol. 37, No. 11, Apr. 1999, pp. 1659-1663.

Bahari, K. et al. "Radiation-induced Graft Polymerization of Styrene onto Poly(3-hydroxybutyrate) and Its Copolymer with 3-hydroxyvalerate", *Die Angewandte Makromolekulare Chemie (Applied Macromolecular Chemistry and Physics)*, 250, 1997, pp. 31-44.

Abstract, JP 03-134011 A, Jun. 7, 1991, Daicel Chem Ind Ltd.

* cited by examiner

A

B

C

METHODS OF MAKING FUNCTIONAL BIODEGRADABLE POLYMERS

RELATED APPLICATIONS

The present application claims priority to U.S. Provisional Application Ser. No. 60/389,026, filed on Jun. 14, 2002.

BACKGROUND OF THE INVENTION

The present invention concerns methods of making functional biodegradable materials, and their biomedical applications.

As used herein, biodegradable polymers are as polymers which are degradable in a physiologically relevant environment, either by hydrolysis, by enzymatic reactions or by other mechanisms, to produce biocompatible or non-toxic by products (see also Chih-Chang Chu, "Biodegradable Polymeric Biomaterials: An Overview", in J D Bronzino, editor-in-chief, *The Biomedical Engineering Handbook*, CRC Press, 1995; Yichun Sun et al., "Biodegradable Polymers and Their Degradation Mechanisms", *American Pharmaceutical Reviews*, 2001, 4(3), 9–18).

Typical examples of natural biodegradable polymers include proteins and polysaccharides such as gelatin, albumin, collagen, starch, detrxan, chitosan and chitin. Typical examples of synthetic biodegradable polymers include polylactic acid, polyglycolic acid, and their copolymers, and the current invention mainly concerns the functionalization of synthetic biodegradable polymers. More information on the making of synthetic biodegradable polymers can be found in Masahiko Okada, "Chemical Synthesis of Biodegradable Polymers", *Progress in Polymer Science*, 2002, 27, 87–133.

The biomedical use of biodegradable polymers is believed to have begun in the 1970s with the first biodegradable sutures prepared from copolymers poly(lactic-co-glycolic acid) (PLGA). Since then, numerous applications in the biomedical field have been made including uses such as wound closures, body implants, tissue engineering materials, and drug delivery materials.

The commonly-used biodegradable polymers such as poly(lactic-co-glycolic acid) and polycaprolactone, as linear aliphatic polyesters, don't contain functional groups such as carboxylic acid groups, hydroxyl groups and amine groups, except at the polymer chain ends. This lack of functional groups greatly limits the application of these synthetic biodegradable polymers. Functional groups containing reactive sites could, for example, bind to biologically active compounds such as peptides in order to help direct cell behavior in a tissue engineering matrix. As another example, the reactive sites could be used to bind drugs, thus making prodrugs and novel drug delivery systems. As yet another example, the incorporated functional groups make further chemical modification much easier, enabling additional properties to be added to the biodegradable polymer such as, for example, making them hydrophilic and water dispersible, and making it possible to have water-based preparation process.

Known methods for the introduction of functional groups into biodegradable polymers are: (1) incorporating special functional monomers at the beginning of the preparation of biodegradable polymers, (2) using reactions through carboxyl acid and hydroxyl groups at the chain ends and (3) using functional polymers as the ring-opening polymerization initiators in the making biodegradable polymers. Representative examples of these three approaches are:

(1) Via the Incorporation of Special Monomers

Copolymers with pendant carboxyl groups were prepared by copolymerization of L-lactide and 3-(S)-[benzoyloxycarbonyl]-methyl]-1,4-dioxane-2,5-dione (BMD), a novel cyclic di-ester monomer consisting of both glycolate and benzyl-α-L-malate units. The copolymerization was carried out in bulk, with stannous 2-ethylhexanoate as catalyst. (see, for example, T. Yamaoka and Y. Kimura, "Biodegradable Copolymers", in J C Salamone edited *Concise Polymeric Materials Encyclopedia*, page 109–111, CRC Press, Boca Raton, 1998). The resulting polymers can only have one pendant carboxyl group for each BMD monomer used, and the making requires a new di-ester monomer from the beginning of ring-opening polymerization and the removal of the benzoyloxy groups to display the pendant carboxyl group.

U.S. Pat. Nos. 5,399,665 and 5,654,381 and D A Barrera et al., *Macromolecules*, 1995, 28, 425–432 and J S Hrkach et al., *Macromolecules*, 1995, 28, 4736–4739 disclosed the making of biodegradable polyesters incorporated with specially-designed lysine residue monomers in the ring-opening polymerization, and also the use of the ε-amine groups in the amino acid residues of these polymers as ring-opening initiators to react with amino acid N-carboxyanhydrides (NCAs) to graft poly(amino acid) chains onto the biodegradable polymers.

(2) Via Reaction at the Chain End:

E B Lavik et al. in *Journal of Biomedical Materials Research Applied Biomaterials*, 2001, 58, 291–294, disclosed the making of block copolymer of PLGA (poly(lactic-co-glycolic acid)) and polylysine by direct coupling of protected polylysine (poly-ε-carbobenzoic-lysine) with carboxylic-acid-ending PLGA polymer, followed by the removal of the protection groups from the polylysine blocks.

WO 00/60956 (C. -Y. Won et al.) and Y. Zhang et al., *Journal of Polymer Science A: Polymer Chemistry*, 1999, 37, 4554–4569 disclose the modification of PLGA polymers by first adding vinyl groups at their chain ends, and then reacting the modified polymers with vinyl-group-incorporated polysaccharides such as dextran. The resulting network then has both hydrophilic and hydrophobic components.

M. Furch et al. in *Polymer*, 1998, 39, 1977–1982 describes the synthesis of copolymers of polyglycolide and methyl acrylate (PMA-g-PGA), by firstly making vinyl-group-ending polyglycolide macromonomers, which in turn was made by HEMA (2-hydroxylethy methacrylate)-initiated ring-opening polymerization of glycolide. In the same paper, they mentioned that copolymers of polylactide with vinyl pyrrolidone and N,N'-dimethyl-acrylamide co-monomers. H. Shinoda and K. Matyjaszewski in *Macromolecules*, 2001, 34, 6243–6248 describe the making of poly(methyl methacrylate)-g-poly(lactic acid) (PMMA-g-PLA) by a similar procedure but through the atom transfer radical polymerization.

(3) Via the Use of Polyols as the Polymerization Initiators:

Block copolymers of PLGA and poly(ethylene glycol) (PEG) have been discussed in the literature by J L Hill-West et al., in the *Proceeding of National Academy of Science USA*, 1994, 91, 5967–5971; by J L West et al., *Proceeding of National Academy of Science USA*, 1996, 93, 13188–13193; by B. Jeong et al., *Nature*, 1997, 388, 860–862; by B Jeong et al., *Macromolecules*, 1999, 32, 7064–7069; by T. Riley et al., *Langmuir*, 2001, 17, 3168–3174; and by T. Kissel et al., *Advanced Drug Delivery Reviews*, 2002, 54, 99–134. These copolymers include PLGA-PEG, PLGA-PEG-PLGA and PEG-PLGA-PEG types, and are mainly made by PEG-initiated ring-opening polymerization of cyclic esters.

B. Jeong et al., in *Macromolecules*, 2000, 33, 8317–8322, also discloses the making of graft copolymers PEG-g-PLGA with PEG as the backbone chains and PLGA as the side chains. The grafting reaction was made possible by first incorporate pendanthydroxyl-group-bearing units in the backbone chains and later used these modified PEG chains to ring-opening polymerize lactide and glycolide monomers.

The use of poly(propylene glycol) (PPG) instead of PEG as the initiators for ring-opening polymerize lactide resulted in polylactide-PPG-polylactide tri-block copolymers, was disclosed by T. Yamaoka and Y. Kimura in "Biodegradable Copolymers", in *Concise Polymeric Materials Encyclopedia*, page 109–111, CRC Press, Boca Raton, 1998. It should be noted that the use of PEG and PPG as polymer initiators, though it may change the hydrophilicity of the final polymers, doesn't introduce functional groups in the biodegradable polymers.

U.S. Pat. No. 5,929,196, Y. Li et al. in *Polymer*, 1997, 38, 6197–6206; Y. Li et al. in *Polymer*, 1998, 39, 3087–3097; and A. Breitenbach et al., in *Polymer*, 2000, 41, 4781–4792 describe the making of graft copolymers with PLGA as side chains and polyols as the backbone chains. Their polyols include both neutral polymers such as poly(vinyl alcohol)s and polyelectrolytes such as dextran sulfate sodium, diethylaminoethyl dextran chloride, and also copolymers of poly (vinyl alcohol) and poly(β-methacrylic acid). The copolymers were made by ring-opening polymerization of cyclic ester monomers, with the hydroxyl groups in the polyol backbone chains as the initiators.

An exception to the above-mentioned approaches can be found in U.S. Pat. No. 5,610,241, which discloses the modification of biodegradable polymers such as Poly-DL-lactic acid with side chains of amino acid groups such as L-lysine, where the starting biodegradable polymers have repeating units consisting of carbonyl groups and hydrogen atoms on the carbon on the α position to the carbonyl group. The modification was done first by reacting the starting biodegradable polymers with a base such as alkali metal alkoxides, to form carbon ions on the α-carbon of the carbonyl groups in the repeating units (—CHR—C(=O)— to —C—R—C(=O)—); and then react the carbon-ion-bearing polymers with protected reactive amino acids, followed by the de-protection of side chain groups. The formation of carbon ions in the biodegradable polymers involves low temperature such as −78° C.

As is apparent to those skilled in the art, the known methods to functionalize biodegradable polymers use complicated chemistry and chemical processes. They either use specially designed monomers or multi-step reactions, or extreme reaction conditions. There is a great need to develop a simple and versatile method to make functional biodegradable polymers.

SUMMARY OF THE INVENTION

In response to the discussed problems encountered in the prior art, a new, simple and versatile method has been developed to functionalize biodegradable polymers by direct reaction of the biodegradable polymers in the medium of functional monomers, particularly vinyl monomers. An important point relevant to the current invention is that the commonly-used biodegradable polymers are soluble or dispersible in functional vinyl monomers.

The method to modify biodegradable polymers uses the direct reaction of a biodegradable polymer with at least one vinyl monomer and may take place in the presence of an initiator. The initiator may be free radical initiators, heat, ionic initiators, UV irradiation, ionizing irradiation and other high energy irradiation.

The vinyl monomer may contain functional groups which may be chosen from carboxylic acid groups, hydroxyl groups, amine groups, chloride groups, sulfonic groups, phosphoric groups, aldehyde groups, oxirane groups, mercaptan groups, isocyanate groups, sulfide groups, activated amide groups, activated ester groups, and combinations thereof.

The biodegradable polymers may be chosen from aliphatic polyesters, copolymers of linear aliphatic polyesters and their copolymers, polyanhydrides, polyorthoesters, poly (ester-ether), polyamines, phosphorus-based polymers and combinations thereof. An aliphatic polyester may be chosen from polylactic acid, polyglycolic acid, poly(lactic-co-glycolic acid), polycaprolactone, their copolymers and combinations thereof.

The biodegradable polymer may be dissolved or dispersed in the vinyl monomers. The method may also include a solvent.

Particularly notable combinations of biodegradable polymer and vinyl monomer include poly(lactic-co-glycolic acid) and acrylic acid, polycaprolactone and acrylic acid and poly(lactic-co-glycolic acid) and 2-hydroxylethyl methacrylate.

DETAILED DESCRIPTION OF THE INVENTION

In contrast with the known methods, the present invention is directed to a new, simple and versatile method to functionalize biodegradable polymers. The method is made possible because the commonly-used biodegradable polymers such as poly(lactic-co-glycolic acid) and polycaprolactone are soluble in functional monomers such as acrylic acid and hydroxylethyl methacrylate. The chemical modification of these biodegradable polymers can be done, therefore, by direct reaction of biodegradable polymers in the medium of functional monomers. This is accomplished by starting with the biodegradable polymer, dissolving or dispersing it into the media of functional monomers with the help of suitable initiators or with irradiation and under suitable temperature, forming reactive spots along the biodegradable polymer chains, and thereby grafting monomers onto them.

More information on the uses of functionalized biodegradable compositions may be found in U.S. provisional patent application No. 60/389,022, filed Jun. 14, 2002 using express mail number EL 471213251 US, by the same inventors, and commonly assigned. This application teaches bioadhesive polymers incorporated with biodegradable components. The bioadhesive components used are polycarboxylic acids, particularly poly(acrylic acid), poly(methacrylic acid), and their copolymers, while the biodegradable components can be any synthetic degradable polymer, particularly biodegradable polyesters whose degradation products are low molecular weight acids. Examples of biodegradable components include poly(lactic acid), poly(glycolic acid), poly(lactic-co-glycolic acid), and so on.

Figure 3:
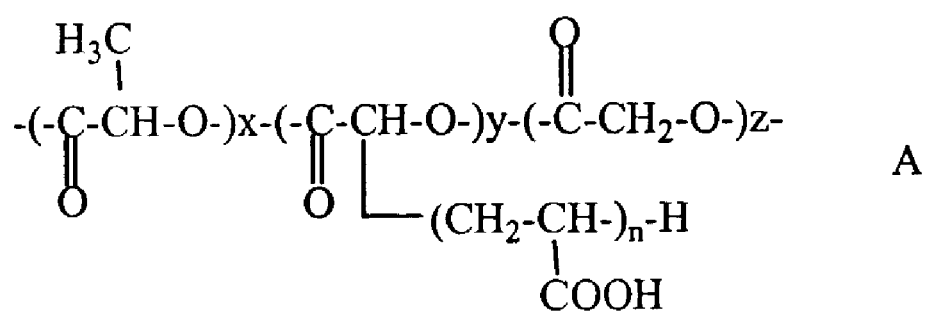
FIG. 3 is a depiction of three possible structures for PLGA-g-PAA (FIGS. 3A, B and C).
Figure 3:
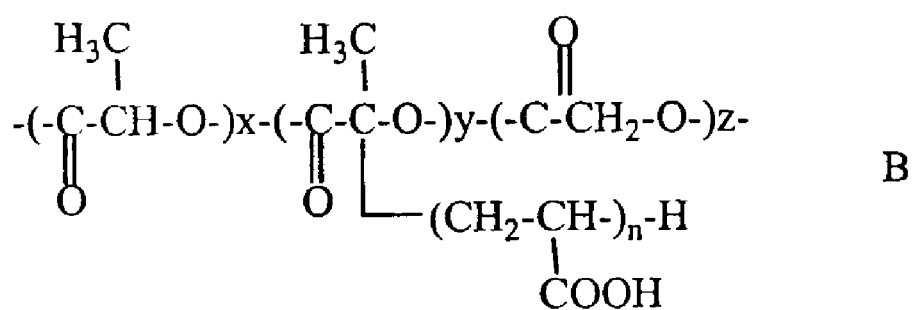
Figure 3:
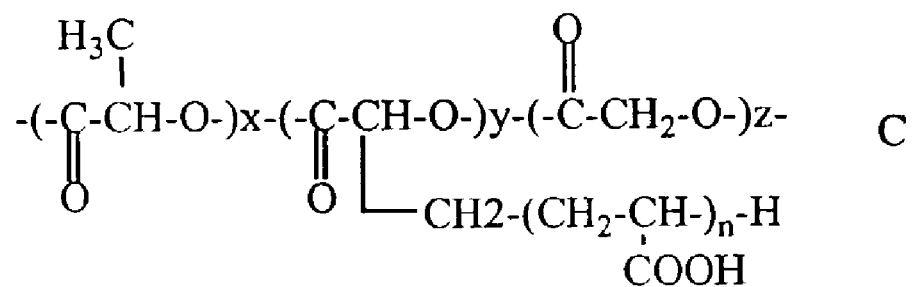
Figure 4:
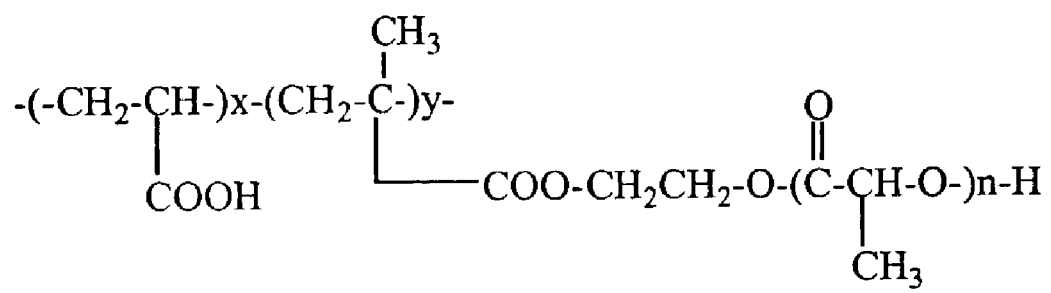
FIG. 4 is a depiction of the structure of PAA-g-PLA.

The two polymer components may be covalently bound to each other forming graft, block or random copolymers. Examples include poly(acrylic acid)-graft-poly(lactic acid) (PAA-g-PLA) and poly(lactic-co-glycolic acid)-g-poly(acrylic acid) (PLGA-g-PAA), the making of which are described in the examples below. Possible structures for PLGA-g-PAA are given in FIGS. 3A, B and C. The structure of PAA-g-PLA is given in FIG. 4. The two components may also be incorporated into one material by forming a non-covalent interpolymer complex via, for example, hydrogen bonding, ionic bonding or hydrophobic bonding. Typical examples in this category include the hydrogen bonding interpolymer complex formed between poly(methacrylic acid) and poly(lactic acid)-b-poly(ethylene glycol)-b-poly(lactic acid) tri-block copolymers, or more generally, complexes formed between polycarboxylic acids and PEG-PLGA copolymers or PVA-PLGA copolymers.

The 17716 materials may be used without including a treatment agent, to provide a lasting acidic pH environment. In this embodiment, the bioadhesive property enables the material to adhere strongly to biological surfaces, while the degradation of the biodegradable polyesters releases non-toxic low molecular weight acids. An acidic pH is very important to maintain or to establish a healthy body cavity environment such as, for example, in the vaginal cavity.

The 17716 materials may also be used as a treatment agent delivery system and the treating agent may be an agents for treating menstruation disorders and infections, agent for treating cardiovascular conditions, agents for treating internal conditions, agents for treating mental health conditions, anti-inflammatory agents, chemotherapeutic agents, cardiac tonics, expectorants, oral antiseptics, enzymes, birth control agents, opthalmic treating agents and combinations thereof. The 17716 materials can be either used without loading active agents as bioadhesive systems slowly releasing low molecular weight acids, or loaded with active agents as bioadhesive drug delivery systems.

Biodegradable Polymers

In addition to synthetic polymers made from bio-related monomers such as amino acids, sugar units and nucleotides, examples of synthetic biodegradable polymers include: (1) linear aliphatic polyesters such as polylactic acid, polyglycolic acid, polycaprolactone, polyhydroxybutyrate, polyhydroxyvalerate and their copolymers within the aliphatic polyester family such as poly(lactic-co-glycolic acid) and poly(glycolic acid-co-caprolactone); (2) copolymers of linear aliphatic polyesters and other polymers such as poly(glycolic acid-co-trimethylene carbonate) copolymers, poly(lactic acid-co-lysine) copolymers, tyrosine-based polyarylates or polyiminocarbonates or polycarbonates, poly(lactide-urethane) and poly(ester-amide) polymers; (3) polyanhydrides such as poly(sebacic anhydride); (4) polyorthoesters such as 3,9-diethyidiene-2,4,8,10-tetraoxaspiro-5,5-undecane based polymers; (5) poly(ester-ether) such as poly-p-dioxanone; (6) polyamides, poly(amide-enamines) and poly(amido amine) dendrimers; and (7) phosphorus-based polymers such as polyphosphazene and poly[bis(carboxy-lactophenoxy) phosphazene.

It should also be noted that biodegradable polymers having unsaturated bonds groups are quite useful for the present invention, since it's believed that it may be easier to generate reactive sites at these groups. These unsaturated bonds may be in the main or side chains. Examples of these biodegradable polymers include those wherein at least one of the monomers is maleic acid.

It should also be noted by those skilled in the art that the biodegradable polymers include the copolymers of the above-described biodegradable polymers and non-biodegradable polymers. Examples include the block copolymers of poly(lactic-co-glycolic acid) and poly(ethylene glycol) as described in U.S. Pat. Nos. 6,117,949 and 6,201,072.

Functional Vinyl Monomers

The vinyl monomers useful in the present invention can be any compounds with a vinyl group, particularly vinyl monomers with functional groups, and more particularly functional monomers with carboxylic acid, hydroxyl and amine groups. The monomers may have more than one vinyl group and hence act as cross-linkers.

The functional vinyl monomers include those with functional groups such as carboxylic acid groups, carboxylic acid chlorides, sulfonic groups, phosphoric groups, amine groups, aldehyde groups, oxirane groups, hydroxyl groups, mercaptan groups, isocyanate groups, sulfide groups, activated amide groups and activated ester groups.

Examples of vinyl monomers containing carboxylic acid groups include acrylic acid, methacrylic acid, butane dicarboxyl acid, 3-butene-1,2,3-tricarboxylic acid, and crotonic acid. Examples of vinyl monomers containing carboxylic acid chloride groups include acryloyl chloride and methacryloyl chloride. Examples of vinyl monomers containing sulfonic acid groups include 2-propene-1-sulfonic acid, 2-sulfoethyl methacrylate, 3-sulfopropyldimethyl-3-methacrylamidopropyl ammonium, and 3-sulfopropyl methacrylate; examples of vinyl monomers with phosphoric acid groups include bis(2-methacryloxyethyl) phosphate and monoacryloxyethyl phosphate.

Examples of vinyl monomers containing primary amine groups include 2-aminoethyl methacrylate hydrochloride and N-(3-aminopropyl) methacrylamide hydrochloride; examples of vinyl monomers containing secondary amine groups include 2-(tert-butylamino)ethyl methacrylate, diallylamine, and 2-(iso-propylamino) ethylstyrene; examples of vinyl monomers containing tertiary amine groups include 2-(N,N-diethylamino)ethyl methacrylate, 2-(diethylamino) ethyl styrene, 2-(N,N-dimethylamino) ethyl acrylate, N-[2-(N,N,-dimethylamino)ethyl] methacrylamide, 2-(N,N-dimethylamino) ethyl methacrylate, N-[3-(N,N-dimethylamino)propyl] acrylamide, N-[3-(N,N-dimethylamino)propyl] methacrylamide, and 4-vinylpyridine; examples of vinyl monomers containing quaternary amine groups include 2-acryloxyethyltrimethylammonium chloride, diallyldimethylammonium chloride, and 2-methacryloxyethyltrimethyl ammonium chloride.

Examples of vinyl monomers containing aldehyde groups include acrolein. Examples of vinyl monomers containing oxirane groups include allyl glycidyl ether, glycidyl acrylate, and glycidyl methacrylate. Examples of vinyl monomers containing hydroxyl groups include glycerol monomethacrylate, 4-hydroxybutyl methacrylate, 2-hydroxyl acrylate, 2-hydroxyethyl methacrylate, N-(2-hydroxypropyl) methacrylamide, and hydroxypropyl methacrylate. Examples of vinyl monomers containing mercaptan groups include N,N'-cyctaminebisacrylamide. Examples of vinyl monomers containing isocyanate groups include dimethyl-3-isopropenylbenzyl isocyanate. Examples of vinyl monomers containing sulfide groups include 2-(ethylthio)ethyl methacrylate. Examples of vinyl monomers containing methylolamide groups include N-methylolacrylamide.

Examples of vinyl monomers containing activated ester groups include N-acryloxysuccnimide.

The Direct Reaction of Biodegradable Polymers in Functional Monomers

One of the methods of making graft copolymers is via the formation of reactive centers on the polymer chain backbone in the presence of the monomers that will be grafted onto it. In the present invention, the backbones are the biodegradable polymers while the monomers used for grafting are vinyl monomers.

The creation of reactive centers along the biodegradable polymers can be made by free radical initiators such as peroxides, persulfates, or azo-compounds, by heat, by UV or other ionizing irradiation or other high energy irradiation methods, or by cationic or anionic (i.e. ionic) initiators. More and specific examples of these initiation methods can be found in "Principles of Polymerization" by G. Odian, McGraw-Hill Inc., New York, 1970.

As another method, the reactive centers may be first created on the biodegradable polymer chains, and the reactive biodegradable polymers can then be dissolved into the vinyl monomers. This method may be an effective way to minimize the homopolymerization of the vinyl monomers and hence improve the grafting efficiency.

Still another method involves activation of the biodegradable polymers in the presence of oxygen to form peroxide and hydroperoxide groups along the chains, which are then thermally decomposed to polymer radicals in the presence of the vinyl monomers.

Without being limited to any particular theory for the chain transfer method of grafting, it's believed that the efficiency of the grafting reaction, i.e., the amount of graft polymerization relative to homopolymerization, is dependent on the tendency of a radical to chain transfer relative to its tendency to propagate. One can make a reasonable estimate of the grafting efficiency for a particular monomer/polymer combination from the values of the propagation rate constant for the monomers and the transfer constants for the degradable polymers. For the irradiation methods, it's believed that the grafting efficiency depends on the relative rates of reactive center formation in the degradable polymers and the vinyl monomers, which usually corresponds at least qualitatively to the transfer constants for the degradable polymers and the vinyl monomers, or to the bond energies of the weakest bonds of the polymers and the monomers.

According to the *Polymer Data Handbook*, edited by J. E. Mark (Oxford University Press, New York, 1999), the solvents for polylactic acid include benzene, chloroform, ethyl acetate, acetone, bromobenzene, m-cresol, dichloroacetic acid, dichloromethane, dioxane, dimethylformamide, isoamyl alcohol, N-methyl pyrrolidones, toluene, tetrahydrofuran, trichloromethane, p-xylene (p 627–633); the solvents for polyglycolic acid are hexafluroisopropanol at room temperature, glycolide and phenol/trichlorophenol at high temperature according to (p 566–569); and the solvents for polycaprolactone include dimethylacetamide, benxzene and chloroform (p 361–362).

It's believed that one of the reasons the literature teaches away from trying to dissolve degradable polymers like poly(lactic-co-glycolic acid) (PLGA) into functional monomers like acrylic acid might be the belief that PLGA degrades very quickly in acidic or basic solutions. As shown in the following examples, however, the direct reaction involved in the present invention would most likely only need a few minutes. Even if the degradation of PLGA in acrylic acid occurs, the degradation should not have a significant effect on the reaction.

Although not intended to be bound to a particular mode of operation, it's believed that the creation of reactive centers on the biodegradable polymer chains likely involves the hydrogen atom abstraction from the backbone chains, caused by irradiation, by hydrogen transfer to the initiator, or by hydrogen transfer to the propagating monomer. The chain transfer and irradiation methods are both likely to yield a mixture of products including the graft copolymer, backbone polymers and homopolymers of the monomer. The relative amount of the three products depends on the monomer/polymer combinations and the reaction conditions.

In the practice of the invention generally, vinyl monomers (such as acrylic acid and HEMA) are polymerized in the presence of a biodegradable polymer (such as PLGA and PLA), with or without the presence of a solvent. The ratio of the monomer to biodegradable polymer may be from 10:90 to 90:10. More particularly, the ratio may be from 30:70 to 70:30 and still more particularly the ratio may be from 40:60 to 60:40.

The consideration on the choice of solvent is solubility of the reagents (monomer and biodegradable polymer) and possible interference with the polymerization process. For example, biodegradable polymers (such as PLA and PLGA) can be polymerized with vinyl monomers (such as acrylic acid and HEMA) in acetone. When the biodegradable polymer is soluble in the vinyl monomer, no solvent is needed for the latter to be polymerized in the presence of the former. Thus, both acrylic acid and HEMA were polymerized in the presence of PLA or PLGA without a solvent in the Examples below.

Polymerizations can be initiated by a free radical, ionic, cationic or an organometallic monomer. Depending on the nature of the initiator, polymerization may be initiated thermally or by radiation, at elevated or room temperatures. An example of a free radical initiator useful for polymerizing vinyl monomers is 2,2'-azobisisobutyronitrile (AIBN; 98%, from Aldrich Chem., catalog no. 44, 109-0, CAS 78-67-1). When AIBN is used as an initiator, heating the mixture to >50° C. will initiate the polymerization. Typically, 0.01–2 weight percent of the initiator, relative to the monomer, may be used.

Alternatively, the monomers may be polymerized thermally or by radiation without the presence of an initiator.

The following examples illustrate the method of this invention in greater detail:

EXAMPLE 1

PLGA/AA Systems

Two sets of experiments were done to prove firstly that PLGA is soluble in acrylic acid. (1) 1 g of PLGA from Alkermes, Cambridge, Mass. (Medisorb® PLGA DL 5050 1A) was mixed with 1 g acrylic acid from Aldrich Chemical Company of Milwaukee, Wis., (catalog no. 14723-0, vacuum distilled to remove inhibitors) and stirred for 40 minutes, the final mixture was homogeneous; (2) 1 g PLGA was dissolved in 1 g acetone. Then, 40 ml of acrylic acid was added to the solution, and resulted in a homogeneous and clear solution. The whole solution was poured into 800 mL water and white precipitation was observed.

As a test, 5.7 g PLGA was dissolved in 5.7 g acrylic acid with stirring. After the dissolution, 0.014 g 2,2'-azobisobutyronitrile (AIBN) 98%, from Aldrich Chem. (catalog no. 44, 109-0, cas no. 78-67-1) was added into the solution, and the whole system was transferred into a 70° C. oil bath. After 5 minutes, there was a self-acceleration effect observed and the whole system solidified. The mixture was put into a vacuum oven to remove the unreacted monomers.

Figure 1:
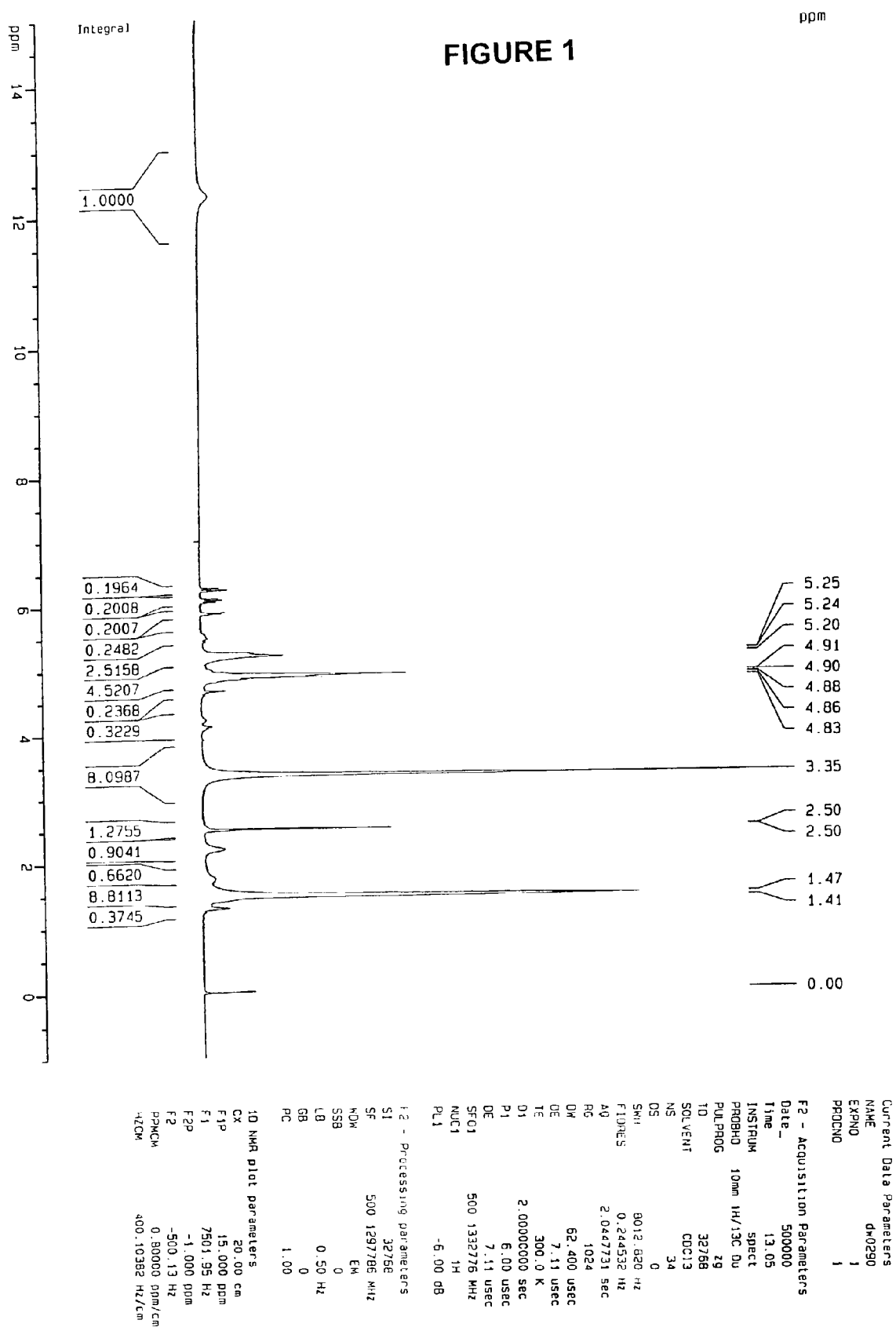
FIGS. 1 and 2 are 1H-and 13C-NMR graphs of the reaction product of Example 1.
Figure 2:
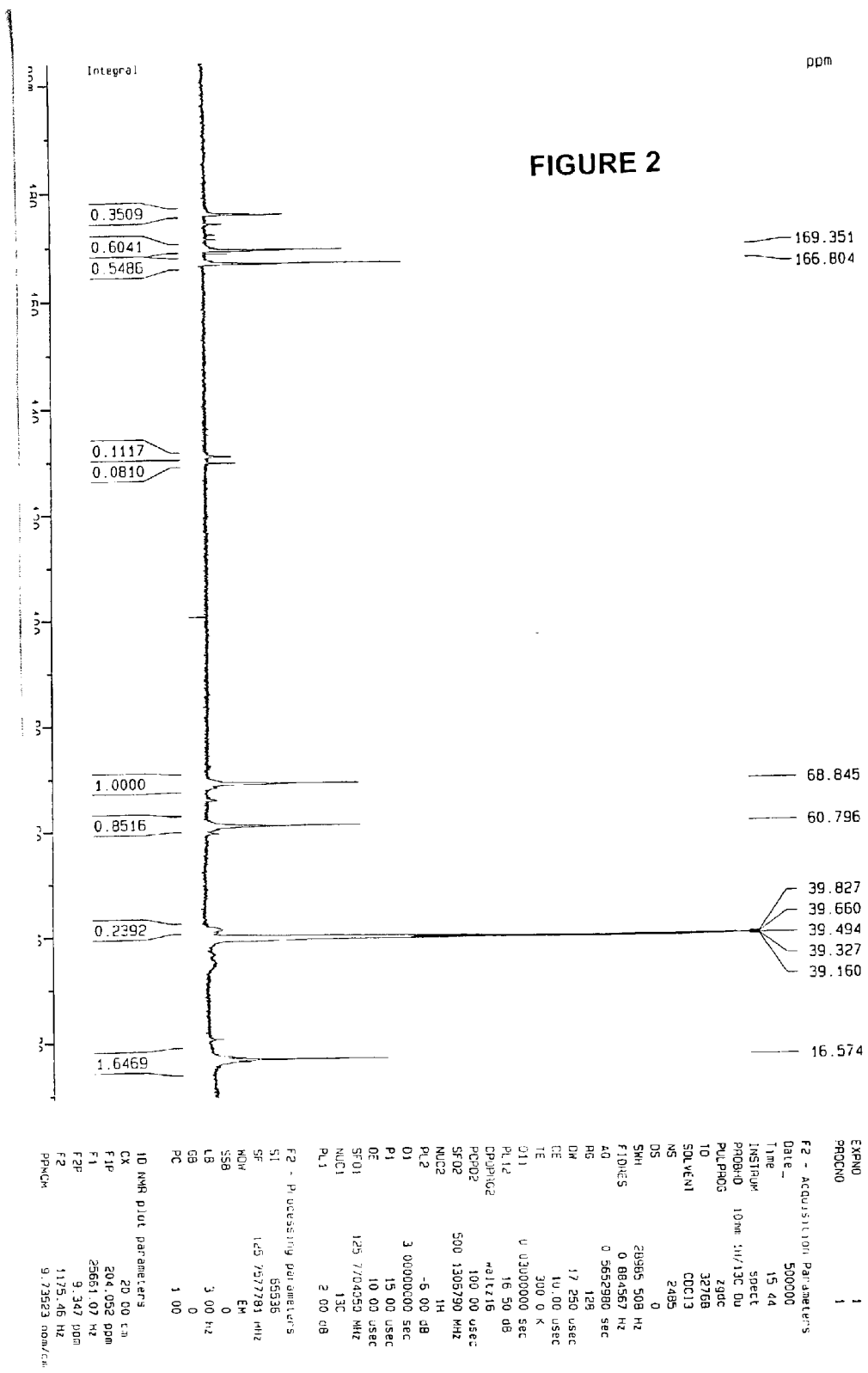

The $^1$H- and $^{13}$C-NMR spectra of the product polymer are shown in FIGS. 1 and 2, respectively. Both PLGA and PM groups have been identified.

The solution structure of the product polymer was also tested using a Coulter tester. The pH was adjusted with NaOH. In pH 9.6 solution, PLGA-g-PAA formed a milky solution with average particle size of 2 micron. The particle aggregation and precipitation became significant after one day of preparation. Further increasing pH to 13.7 resulted in a clear solution of PLGA-g-PAA with average particle size of 347 nm.

EXAMPLE 2

Polycaprolactone in Acrylic Acid

This example illustrates that polycaprolactone is also soluble in acrylic acid, and hence it also may be functionalized by direct reaction in acrylic acid.

First, 1 g of polycaprolactone from Aldrich (catalog no. 44075-2, MW 10,000) was mixed with 5 g acrylic acid from Aldrich (catalog no. 14723-0). After 50 minutes of stirring, the mixture became a clear and homogeneous solution. The solution was then poured into 100 ml of water, and formed white precipitate.

As a second test, 2 g polycaprolactone was dissolved in 2 g chloroform, a known solvent for it. The solution was then poured into 30 mL of acrylic acid, resulting a clear solution. This solution was then poured into 800 mL water, and a white precipitate was observed, followed by phase separation of chloroform/water.

As a third test, 2 g polycaprolactone was stirred and mixed with 2 g acrylic acid. After 2 hours, a homogeneous mixture was formed.

EXAMPLE 3

PLGA in HEMA

This example is to show that PLGA is also soluble in another biocompatible and functional monomer, 2-hydroxylethyl methacrylate (HEMA). 1 g of PLGA (Medisorb® PLGA DL 5050 1A) was mixed with 5 g HEMA from Aldrich (catalog no. 12863-5) with stirring. It was found that PLGA was easily dissolved. Then, 4 g more PLGA was added to the solution, and it was also easily dissolved. To the above formed solution, 0.01 g AIBN was added and dissolved. The new solution was transferred to a 65–75° C. oil bath. After 5 minutes, the mixture became milky and solidified, i.e., the solution reacted.

Many variations of this method will be apparent to those who are skilled in the art, and are contemplated to be within the scope of the present The biodegradable polymers, for example, can be used in mixtures of several polymers, and the monomer medium can comprise more than one type of monomer. Furthermore, the use of a solvent as mentioned above, other than vinyl monomer, is considered within the scope of the present invention. Such solvents might be useful to help the dissolution or dispersion of biodegradable polymers in the vinyl monomers. Also known to those skilled in the art, however, is that the presence of other solvents might decrease the grafting efficiency. Again without being limited to a particular theory, it's believed that the solvents other than vinyl monomers may compete with the biodegradable polymers for chain transfer reaction.

What is claimed is:

1. A method of modifying a biodegradable polymer, the method comprising forming a solution or dispersion that contains a biodegradable polymer dissolved in a vinyl monomer, and directly reacting the vinyl monomer with the biodegradable polymer to form a copolymer that contains a vinyl monomer chain grafted onto a biodegradable polymer backbone.

2. The method of claim 1, wherein the vinyl monomer contains a functional group selected from the group consisting of carboxylic acid groups, hydroxy groups, carboxylic acid chloride groups, sulfonic groups, phosphoric groups, aldehyde groups, oxirane groups, mercaptan groups, isocyanate groups, sulfide groups, amine groups, activated amide groups, activated ester groups, and combinations thereof.

3. The method of claim 2, wherein the vinyl monomer contains a functional group selected from the group consisting of carboxylic acid groups, hydroxy groups, amine groups, and combinations thereof.

4. The method of claim 1, wherein the vinyl monomer contains a carboxylic acid group.

5. The method of claim 4, wherein the vinyl monomer is acrylic acid.

6. The method of claim 1, wherein the vinyl monomer is 2-hydroxyethyl methacrylate.

7. The method of claim 1, wherein the biodegradable polymer is selected from the group consisting of aliphatic polyesters, polyanhydrides, polyorthoesters, poly(esterether), polyamines, phosphorous-based polymers, and copolymers thereof.

8. The method of claim 1, wherein the biodegradable polymer is a linear aliphatic polyester or a copolymer thereof.

9. The method of claim 8, wherein the biodegradable polymer is selected from the group consisting of polylactic acid, polyglycolic acid, poly(lactic-co-glycolic acid), polycaprolactone, and copolymers thereof.

10. The method of claim 9, wherein the biodegradable polymer is poly(lactic-co-glycolic acid).

11. The method of claim 9, wherein the biodegradable polymer is polycaprolactone.

12. The method of claim 1, wherein the ratio of the vinyl monomer to the biodegradable polymer is from about 30:70 to about 70:30.

13. The method of claim 1, further comprising creating a reactive center on the biodegradable polymer using an initiator.

14. The method of claim 13, wherein the initiator is a free radical initiator.

15. The method of claim 1, further comprising subjecting the biodegradable polymer and the vinyl monomer to irradiation.

16. The method of claim 15, wherein the irradiation is UV irradiation, ionizing irradiation, or other high energy irradiation.

17. The method of claim 1, wherein the reaction occurs at room temperature.

18. The method of claim 1, wherein the reaction occurs at an elevated temperature.

19. The method of claim 1, wherein the solution or dispersion also contains a solvent.

20. A method of modifying a biodegradable polymer, the method comprising:

forming a solution or dispersion that contains the biodegradable polymer and a vinyl monomer; and subjecting the biodegradable polymer and the vinyl monomer to irradiation in the presence of an initiator to form a copolymer that contains a vinyl monomer chain grafted onto a biodegradable polymer backbone.

21. The method of claim 20, wherein the vinyl monomer contains a carboxylic acid group.

22. The method of claim 20, wherein the biodegradable polymer is a linear aliphatic polyester or a copolymer thereof.

23. A modified biodegradable polymer comprising a biodegradable polymer backbone to which is grafted a vinyl monomer chain, the vinyl monomer chain containing carboxylic acid groups and the biodegradable polymer backbone containing poly(lactic-co-glycolic acid).

24. The modified biodegradable copolymer of claim 23, wherein the vinyl monomer chain is derived from acrylic acid.

25. The modified biodegradable copolymer of claim 23, wherein the vinyl monomer chain is derived from 2-hydroxyethyl methacrylate.

26. A method of modifying a biodegradable polymer, the method comprising directly reacting a vinyl monomer with the biodegradable polymer to form a copolymer that contains a vinyl monomer chain grafted onto a biodegradable polymer backbone, wherein the reaction occurs at room temperature.

27. The method of claim 26, wherein the vinyl monomer contains a carboxylic acid group.

28. The method of claim 26, wherein the biodegradable polymer is a linear aliphatic polyester or a copolymer thereof.

29. The method of claim 26, further comprising creating a reactive center on the biodegradable polymer using a free radical initiator.

30. The method of claim 26, further comprising subjecting the biodegradable polymer and the vinyl monomer to irradiation.

31. The method of claim 26, further comprising forming a solution or dispersion that contains a biodegradable polymer dissolved in a vinyl monomer.

* * * * *